Oct. 31, 1950     J. N. WEILAND     2,527,865
FLUID ACTUATED CLUTCH AND BRAKE MECHANISM
Filed Aug. 13, 1947     3 Sheets-Sheet 1

INVENTOR.
JOHN N. WEILAND
BY
Gustav A. Wolff
ATT

Oct. 31, 1950   J. N. WEILAND   2,527,865
FLUID ACTUATED CLUTCH AND BRAKE MECHANISM
Filed Aug. 13, 1947   3 Sheets-Sheet 2

INVENTOR.
JOHN N. WEILAND
BY
Gustav A. Wolff
ATT.

Oct. 31, 1950     J. N. WEILAND     2,527,865
FLUID ACTUATED CLUTCH AND BRAKE MECHANISM
Filed Aug. 13, 1947     3 Sheets-Sheet 3

INVENTOR.
JOHN N. WEILAND
BY
*Gustav A. Wolf*
ATT.

Patented Oct. 31, 1950

2,527,865

UNITED STATES PATENT OFFICE 2,527,865

FLUID ACTUATED CLUTCH AND BRAKE MECHANISM

John N. Weiland, Cleveland, Ohio, assignor to The Cleveland Punch & Shear Works Co., Cleveland, Ohio, a corporation of Ohio Application August 13, 1947, Serial No. 768,386

11 Claims. (Cl. 192—17)

This invention relates to a clutch and brake mechanism for power presses and other driven machines in which a clutch mechanism transmits motion and energy of driven fly-wheels to parts to be driven and brake mechanism actuated whenever the clutch mechanism is inactive arrests the motion of the driven parts.

Other mechanisms of this type are described in Patent No. 2,458,664, dated January 11, 1949, and in co-pending applications, Serial Nos. 772,117, filed September 4, 1947, and 778,224, filed October 6, 1947.

The primary object of the present invention is the provision of a fluid operated clutch and brake mechanism for machines of the type referred to above, which mechanism includes an assembly of shiftable unitary clutch and brake shoe means selectively shiftable to clutching action by fluid operated means and braking action by pretensioned spring means, the assembly being constructed to effect automatic braking action by the spring means with a force including the force of the pretensioned spring means and a fraction of the force of the centrifugal forces created by rotation of the clutch and brake shoe means.

Another object of the invention is the provision of a fluid operated clutch and brake mechanism for machines of the type referred to above, which mechanism includes an assembly of shiftable unitary clutch and brake shoe means selectively shiftable to clutching action by fluid operated means and braking action by pretensioned spring means, the assembly including lever and eccentric members arranged to effect automatic braking action by the spring means with a force including the force of the pretensioned spring means and a fraction of the centrifugal forces created by rotation of the clutch and brake shoe means.

A further object of the invention is the provision of a fluid operated clutch and brake mechanism for machines of the type referred to above, which mechanism includes an assembly of shiftable unitary clutch and brake shoe means selectively shiftable to clutching action by fluid operated means and braking action by pretensioned spring means, the assembly including lever and eccentric members coupled with the clutch and brake shoe means and pretensioned compression spring means and fluid operated means, the lever and eccentric members effecting automatic braking action of the clutch and brake shoe means with a force including the force of the pretensioned spring means and a fraction of the centrifugal forces created by rotation of the clutch and brake shoe means.

In addition, the invention has other marked improvements and superiorities which radically distinguish it from presently known structures. These improvements or superior characteristics embodying certain novel features of construction are clearly set forth in the appended claims; and a preferred form of embodiment of the invention in hereinafter shown with reference to the accompanying drawings forming part of the specification.

Figure 1:
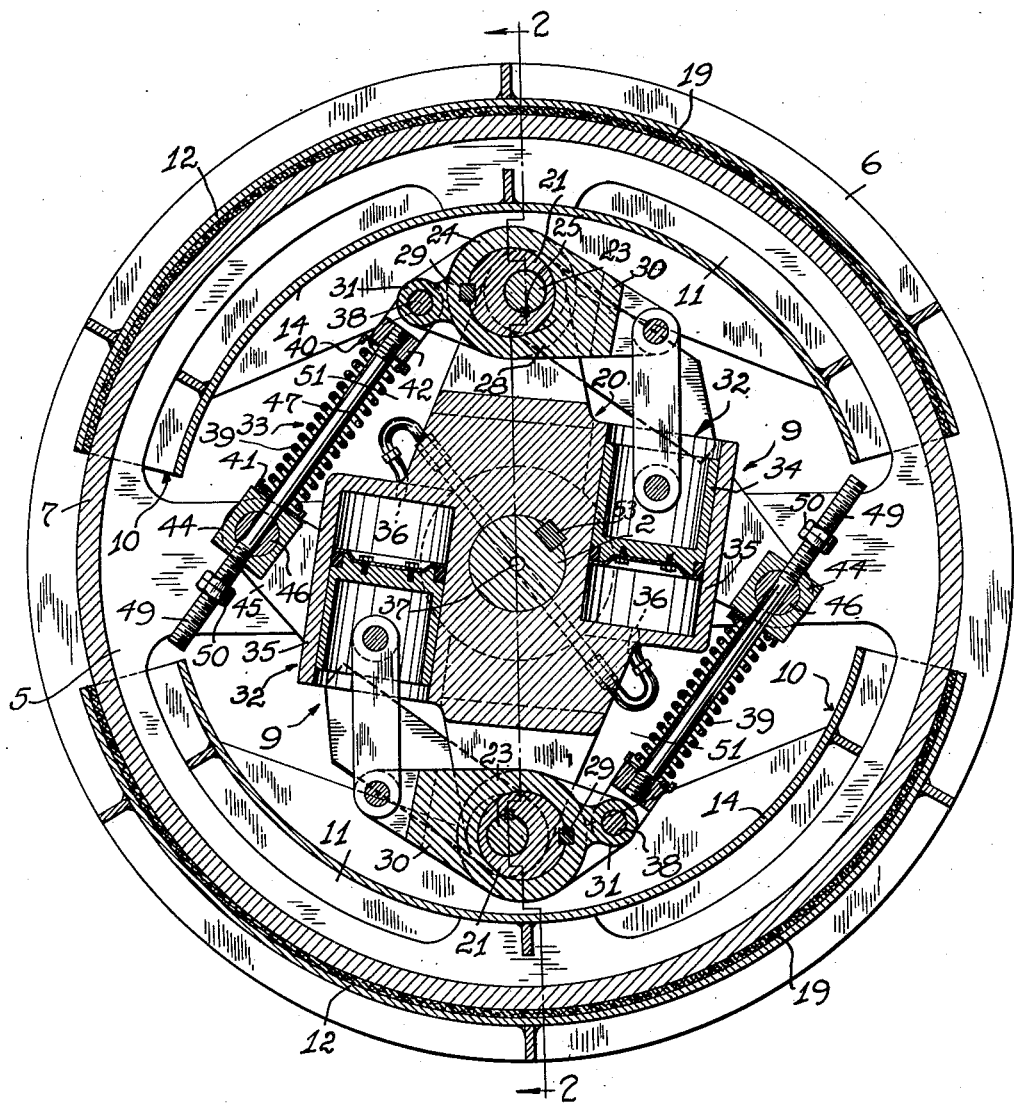
Fig. 1 is a transverse sectional view through a fluid operated clutch and brake mechanism constructed in accordance with the invention, the mechanism being shown attached to the driven member, and coupled with the fly-wheel, of a power driven machine such as a power press, the section being taken on line 1—1 of Fig. 2 of the drawings.
Figure 2:
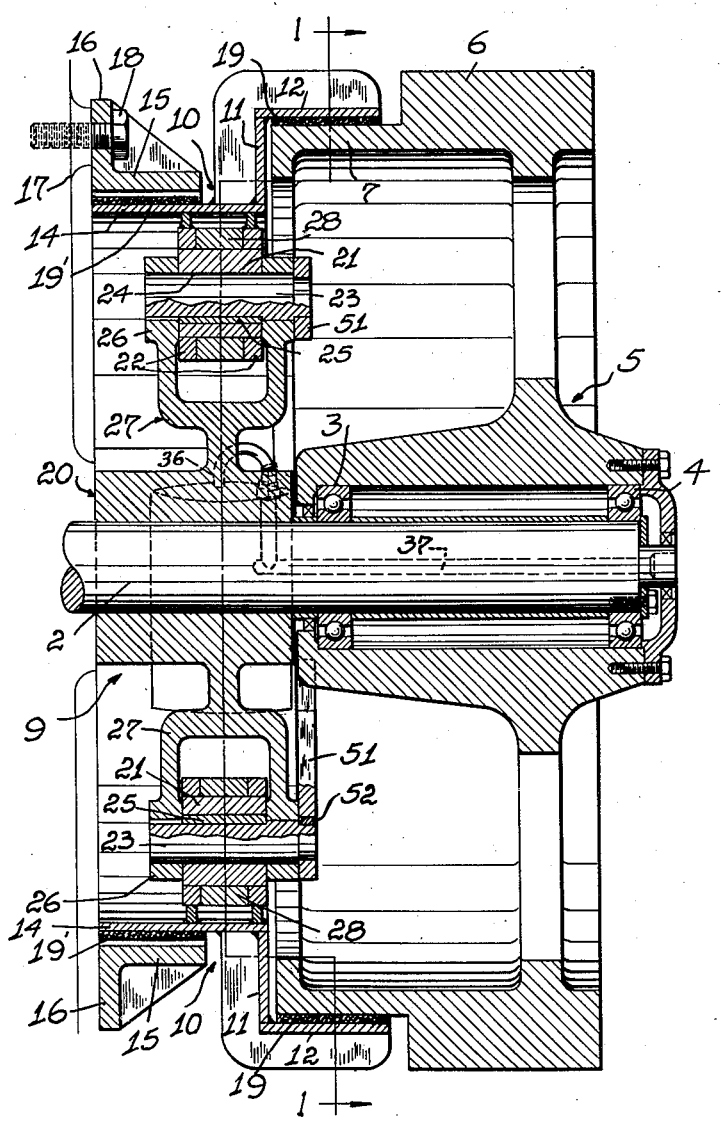
Fig. 2 is a longitudinal cross-sectional view through the fluid operated clutch and brake mechanism shown in Fig. 1, the section being taken on line 2—2 of Fig. 1.
Figure 3:
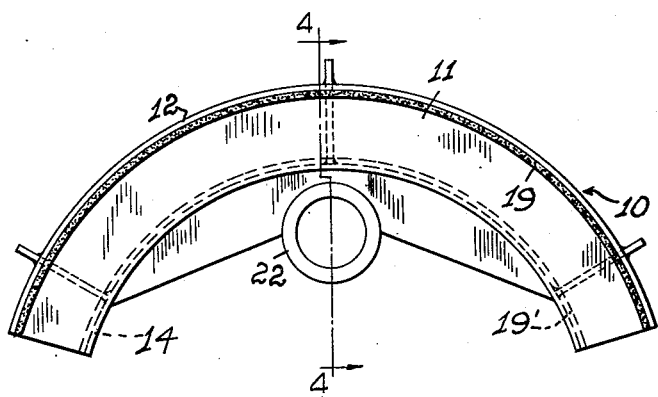
Fig. 3 is a side elevation of the clutch and brake shoe member.
Figure 4:
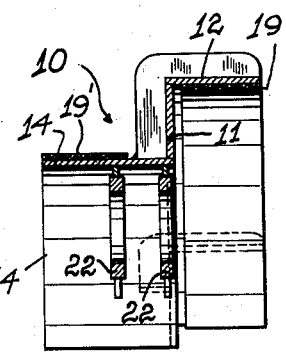
Fig. 4 is a cross-sectional view through the clutch and brake shoe member, the section being taken on line 4—4 of Fig. 3.
Figure 5:
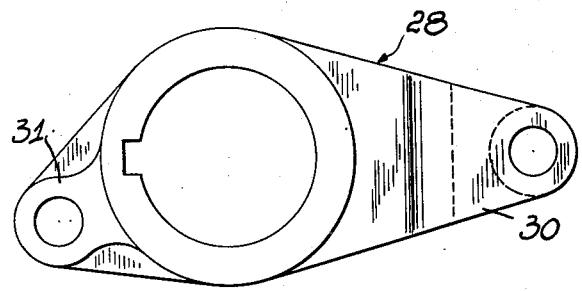
Fig. 5 is a side elevation of the lever member actuating the clutch and brake shoe member.
Figure 6:
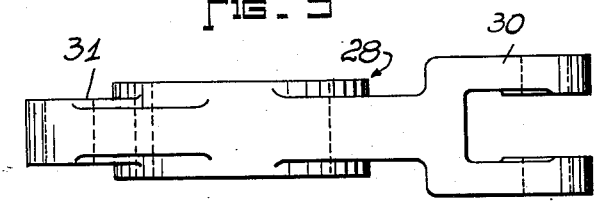
Fig. 6 is a plan view of the lever member shown in Fig. 5.
Figure 7:
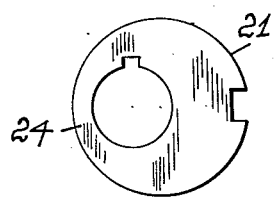
Fig. 7 is a front elevation of the eccentric member pivotally supporting the clutch and brake shoe member and rigidly coupled with the actuating lever member.
Figure 8:
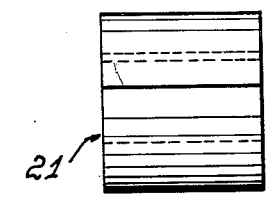
Fig. 8 is a side elevation of the eccentric member shown in Fig. 7.
Figure 9:
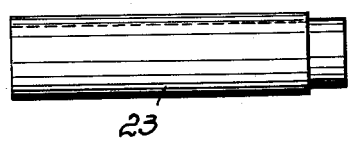
Fig. 9 is a side elevation of the supporting pin pivotally connecting the base member of the fluid operated shifting device with the eccentric member.

Referring now more in detail to the exemplified form of the invention shown in the drawings, reference numeral 2 denotes the crank shaft of a power driven machine, such as a power press, which shaft freely rotatably mounts in roller bearings 3 and 4 a fly-wheel 5 driven in any suitable manner. Fly-wheel 5 has laterally extended from its rim portion 6 a circumferential flange 7 with a smoothly finished peripheral surface, which flange forms a friction clutch drum member for a clutch and brake mechanism 9 mounted on shaft 2. Clutch and brake mechanism 9 includes two oppositely arranged shiftable clutch and brake shoe members 10, each of which embodies a substantially half-circular web portion 11 and half-circular flanges 12 and 14 extended laterally from said web portion in opposite directions. The curved flange 12 extends toward and above flange 7 of fly-wheel 5 for clutching operations with said latter flange, and curved flange 14 extends away from fly-wheel 5 toward and above a brake drum 15 for cooperation therewith. Brake drum 15 includes a circumferential flange 16 and is secured to frame 17 of the power driven machine by bolts 18.

The identically constructed clutch and brake shoe members 10 each have their flanges 12 and 14 lined with brake-lining 19, 19' to insure the desired clutching and braking action with flange 7 and brake drum 15, respectively. Each clutch and brake shoe member is shiftably coupled with base member 20 of clutch and brake mechanism 9 by a short eccentric member 21 rotatably supported in bearing sleeves 22 attached to flange 14 of such clutch and brake shoe member. This eccentric member 21 is rotatably supported by a pin 23 extended through an eccentric bore 24 in member 21 and secured thereto by a key 25, which pin is pivotally coupled with perforated ear portions 26 of a fork-shaped extension 27 on base member 20. A rotation of the thus pivotally supported eccentric member effects shifting of the clutch and brake shoe member to clutching or braking positions, and such a rotation of eccentric member 21 is effected by an actuating lever member 28 sleeved upon eccentric member 21 and keyed thereto by a key 29. The actuating lever 28 embodies oppositely extended lever arms 30 and 31 which are coupled with a fluid operated shifting device 32 and a spring assembly 33, respectively. Thus lever arm 30, which is slightly longer than lever arm 31, is linked to piston 34 of fluid operated shifting device 32 having its cylinder 35 formed as an integral part of base member 20, and lever arm 31 is pivoted to pretensioned spring assembly 33 pivoted to the base member 20, as will be later described. The fluid operated shifting device is actuated in one direction by fluid entering cylinder 35 through a passage 36 in the bottom wall of the cylinder. This passage is in open communication with a bore 37 in shaft 2 and permits feeding of fluid into cylinder 35 to force piston 34 outwardly and therewith inward movement of clutch and brake shoe member 10 into clutching contact with flange 7 of fly-wheel 5.

The pretensioned spring assembly 33 effects shifting of actuating lever 28 in an opposite direction when fluid pressure in cylinder 34 is released and the fluid contained in said cylinder permitted to be discharged therefrom through passage 36 and bore 37 in any suitable manner. Pretensioned spring assembly 33, pivoted to lever arm 31 of lever member 28 by a pin 38, embodies an elongated compression spring 39 seated between two washers 40 and 41, washer 40 abutting a clevis 42 pivotally coupled by pin 38 with lever arm 31 and washer 41 abutting a block member 44 pivotally coupled with a fork-shaped extension 45 on base member 20 by pin 46. A guide rod 47, threadedly engaged with clevis 42 and slidably extended through pin 46, guides the pretensioned spring 39. This guide rod carries on its outer threaded end 49 nut members 50 which are adjusted to contact block member 44 when the brake lining 19' is worn and should be renewed.

The clutch and brake mechanism is preferably, as shown, provided with means adapted to partially counteract centrifugal forces tending to shift the clutch and brake shoe members 10 radially outwardly when the clutch and brake mechanism is rotating. These counteracting means embody counterweights 51 keyed to pins 23 by key members 52 for joint rotation with eccentric members 21. Counterweights 51 are arranged and proportioned to only partially equalize the centrifugal forces acting on the clutch and brake shoe members when such clutch and brake mechanism is rotated to insure proper clutching action and avoid excessive braking action of clutch and brake shoe members 10.

The present clutch and brake mechanism is particularly well suited for high speed punch presses in which fly-wheels are rotating at more than 400 R. P. M., as the power necessary for quick and proper braking action is proportionate to the centrifugal force created by rotation of the mechanism, so that relatively light springs may readily be used in the pretensioned spring assembly to decrease the counteracting forces of the springs of the spring assembly during shifting of the clutch and brake shoe members from a braking action to a clutching action.

In operation, when the described clutch and brake mechanism is used as described on a power press with a crankshaft 2, fly-wheel 5, according to common practice, is continuously driven by a motor, pulley and belt arrangement (not shown). Starting of the press is effected by feeding fluid into cylinder 35 to shift piston 34 and therewith rotate actuating lever 28 in anti-clockwise direction against the force of pretensioned spring assembly 33. The pivots for such movement of levers 28 are pins 23 pivoted to base member 20 rigidly secured to crankshaft 2 by a key member 53. The movement of levers 28 effects inward shifting of clutch and brake shoe members 10 and frictional clutching engagement of their lined flanges 12 with the peripheral surface of flange 7 on fly-wheel 5. Such clutching engagement transfers the rotary movement of fly-wheel 5 through clutch and brake shoe members 10 to crankshaft 2 by means of eccentric members 21 coupling the shoe members with the base member 20. When in clutching position clutch and brake shoe members 10 have their lined flanges 14 disengaged from frictional contact with brake drum 15 and the pretensioned spring assemblies 33 have their pretensioned compression springs 39 additionally tensioned. Disengagement of the clutching action of flanges 12 with flange 7 is automatically effected by release of the fluid from cylinders 35. Such a release may be induced in any customary manner and permits springs 39 in cooperation with the centrifugal forces created by rotation of clutch and brake mechanism 9 with fly-wheel 5 to rotate actuating lever members 28 in a clockwise direction. Such movement of levers 28 effects shifting of clutch and brake shoe members 10 outwardly so that their lined flanges 14 frictionally and with great force engage brake drum 15 and stop further rotation of base member 20 and crankshaft 2 connected therewith.

The clutch and brake mechanism herein described may of course be used as a so-called two-way friction clutch adapted to selectively couple independently rotatable driving and driven members with each other, which two-way friction clutch is especially suitable for use with two ratio or reversible transmission, such as Marine Transmission, etc.

Having thus described my invention:
What I claim is:

1. In clutch and brake mechanism a driving member including a peripheral surface, a driven member, means affording a stationary braking surface, unitary clutch and brake shoe means arranged to selectively cooperate with said two surfaces, a lever member pivotally connected with said driven member and eccentrically pivoted to said clutch and brake shoe means, fluid operated means coupled with said lever member to effect radial inward shifting of said clutch and brake shoe means for engagement with the peripheral surface of said driving member, and a spring assembly coupled with said lever member to effect radial outward shifting of the clutch and brake shoe means for engagement with the stationary braking surface when said fluid operated means are inactive.

2. In a clutch and brake mechanism a driving member including a peripheral surface, a driven member, means affording a stationary braking surface, unitary clutch and brake shoe means arranged to selectively cooperate with said two surfaces, a lever member pivotally connected with said driven member and eccentrically pivoted to said clutch and brake shoe means, fluid operated means coupled with said lever member to effect radial inward shifting of said clutch and brake shoe means for engagement with the peripheral surface of said driving member, a spring assembly coupled with said lever member to effect radial outward shifting of the clutch and brake shoe means for engagement with the stationary braking surface when said fluid operated means are inactive, and weighted means arranged on said driven member and adapted to partly counteract centrifugal forces on said clutch and brake shoe means when the driven member of said mechanism is rotating.

3. A clutch and brake mechanism as described in claim 2, wherein said weighted means are coupled with said lever member to partly counteract centrifugal forces on said clutch and brake shoe means proportionate to their distance from the axis of said driven member.

4. In a clutch and brake mechanism a driving member including a peripheral surface, a driven member including a base member centrally thereof, means affording a stationary braking surface, unitary clutch and brake shoe means arranged to selectively cooperate with said two surfaces, a lever member having its central portion pivoted to the base member of said driven member and including eccentric means coupled with said clutch and brake shoe means, fluid operated means including a cylinder arranged in said base member and a piston linked to one side of said lever member adapted to effect radial inward shifting of said clutch and brake shoe means for engagement with the peripheral surface of said driving member, and a spring assembly pivotally connected to said base member and the other side of said lever member adapted to effect radial outward shifting of said clutch and brake shoe means for engagement with the stationary braking surface when said fluid operated means are inactive.

5. In a clutch and brake mechanism a driving member including a peripheral surface, a driven member, means affording a stationary braking surface arranged adjacent to said driven member, unitary clutch and brake shoe means having laterally spaced clutch and braking members adapted to selectively cooperate with said surfaces and including a bearing centrally thereof, a lever arrangement having a shaft pivotally coupled with said driven member and an eccentric pivoted in the bearing of said clutch and brake shoe means, and actuating means associated with said driven member and coupled with said lever arrangement for rocking same on said shaft to effect selective radial inward shifting of said clutch and brake shoe means into clutching engagement with the peripheral surface of said driving member and selective radial outward shifting of said clutch and brake shoe means into braking engagement with said stationary member.

6. In a clutch and brake mechanism a base member, shiftable friction shoe members having inner and outer friction surfaces, a circular driving member encircled by the inner friction surfaces of said friction shoe members, a second circular member encircling the outer friction surfaces of said friction shoe members, operating devices adapted to shift said friction shoe members to selectively bring their friction surfaces into frictional contact with said circular members, and rocking members coupling said operating devices with said friction shoe members, said coupling members being pivoted to said base member and including eccentrics pivotally connected with said friction shoe members.

7. In clutch and brake mechanism a base member, shiftable friction shoe members having inner and outer friction surfaces, a stationary circular member encircling the outer friction surfaces of said shoe members, a rotary circular member encircled by the inner friction surfaces of said shoe members, fluid operated means adapted to shift the friction shoe members to bring their inner friction surfaces into frictional contact with the rotary circular member, spring operated means adapted to shift the friction shoe members to bring their outer friction surfaces into frictional contact with the stationary circular member, rocking members pivoted to said base member and coupled with said fluid operated and spring operated means and eccentrics on said rocking members pivotally coupled with said friction shoe members.

8. In clutch and brake mechanism a base member, shiftable friction shoe members having inner and outer friction surfaces, a stationary circular member encircling the outer friction surfaces of said friction shoe members, a rotary circular member encircled by the inner friction surfaces of said friction shoe members, air cylinder members on said base member having pistons adapted to shift the friction shoe members to bring their inner friction surfaces into frictional contact with the rotary circular member, spring operated means on said base member adapted to shift the friction shoe members to bring their outer friction surfaces into frictional contact with the stationary circular member, rocking members pivoted to said base member and coupled with the pistons of said air cylinder members and the spring operated means, and eccentrics on said rocking members pivotally coupled with said friction shoe members, said eccentrics being arranged to shift said friction shoes inwardly when said rocking member is actuated by said air cylinder members and outwardly when said rocking member is actuated by said spring operated means.

9. In a clutch and brake mechanism for coupling a circular driving member with a co-axial circular member arranged adjacent to said driving member, a base member arranged between said circular members co-axial therewith, shiftable friction shoe members having friction portions extended laterally and in opposite directions, one of the friction portions of each friction shoe member encircling said driving member and the other friction portion being encircled by said other circular member, operating means on said base member adapted to shift said friction shoe members into frictional contact selectively with said driving member and said circular member, and rocking members coupling said operating devices with said friction shoe members, said coupling members being pivoted to said base member and including eccentrics pivotally connected with said shoe members.

10. In a clutch and brake mechanism a circular driving member and a co-axial circular stationary member arranged adjacent to said driving member, a base member, shiftable friction shoe members each including a body portion radially extended with respect to all said members and friction portions extended laterally from said body portion from opposite sides thereof, one of the friction portions of each friction shoe member encircling said driving member and the other one of the said friction portions extending into said circular stationary member, air-operated means adapted to shift said friction shoe members so that the said one friction portion of each friction shoe member engages said driving member, and spring operated means coupled with said air operated means and adapted to shift said friction shoe members so that the said other one friction portion of each friction shoe member engages said circular member.

11. A clutch and brake mechanism as described in claim 10, including a single means for coupling each of said friction shoes and said air operated and spring operated means, said coupling means each embodying a rocking member pivoted to said base member and coupled with said air operated and spring operated means and an eccentric on said rocking member pivoted to a brake shoe member.

JOHN N. WEILAND.

REFERENCES CITED

The following references are of record in the file of this patent:

UNITED STATES PATENTS

| Number | Name | Date |
| --- | --- | --- |
| 1,643,473 | Ross | Sept. 27, 1927 |
| 2,458,664 | Weiland | Jan. 11, 1949 |